(12) United States Patent
Smoot et al.

(10) Patent No.: US 9,213,888 B2
(45) Date of Patent: Dec. 15, 2015

(54) ELECTRONIC DEVICES IN LOCAL INTERACTIONS BETWEEN USERS

(75) Inventors: Lanny Smoot, Thousand Oaks, CA (US); Armen Mkrtchyan, Glendale, CA (US); Leonard Mazzocco, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 488 days.

(21) Appl. No.: 13/535,168

(22) Filed: Jun. 27, 2012

(65) Prior Publication Data

US 2014/0003651 A1      Jan. 2, 2014

(51) Int. Cl.
*G06K 9/00* (2006.01)

(52) U.S. Cl.
CPC .................................. *G06K 9/00335* (2013.01)

(58) Field of Classification Search
USPC ........ 382/103, 115, 117, 118; 340/5.52, 5.81, 340/5.82
See application file for complete search history.

(56) References Cited

U.S. PATENT DOCUMENTS

| | | | |
|---|---|---|---|
| 4,976,438 A | 12/1990 | Tashiro | |
| 6,669,346 B2 | 12/2003 | Metcalf | |
| 7,184,609 B2 | 2/2007 | Liu | |
| 7,570,437 B2 | 8/2009 | Gal | |
| 7,649,690 B2 | 1/2010 | Simkulet | |
| 7,693,500 B2 | 4/2010 | Van Der Meulen | |
| 7,787,697 B2 * | 8/2010 | Ritzau et al. | 382/224 |
| 8,165,408 B2 * | 4/2012 | Fukaya et al. | 382/224 |
| 8,165,409 B2 * | 4/2012 | Ritzau et al. | 382/224 |
| 8,370,639 B2 * | 2/2013 | Azar et al. | 713/186 |
| 8,457,366 B2 * | 6/2013 | Cheswick | 382/118 |
| 8,510,567 B2 * | 8/2013 | Alderucci et al. | 713/186 |
| 8,665,374 B2 * | 3/2014 | Katz et al. | 348/589 |
| 2009/0093303 A1 | 4/2009 | Neal | |
| 2010/0188328 A1 | 7/2010 | Dodge | |
| 2011/0205147 A1 | 8/2011 | Wilson | |
| 2011/0221129 A1 | 9/2011 | Sisson | |
| 2011/0234488 A1 | 9/2011 | Ge | |

\* cited by examiner

*Primary Examiner* — Yosef Kassa
(74) *Attorney, Agent, or Firm* — Farjami & Farjami LLP

(57) ABSTRACT

In one implementation, a method includes detecting, using a processor, user input through a camera lens. The method further includes determining, using the processor, that an identity of a user, selected from identities of at least two users, is associated with the user input. The method also includes tracking, using the processor, a local interaction between the at least two users based on at least the identity, the user input, and stored rules that govern the local interaction. The tracking can include determining whether the user has complied with the stored rules that govern the local interaction. Furthermore, the local interaction can include a multiplayer game.

16 Claims, 4 Drawing Sheets

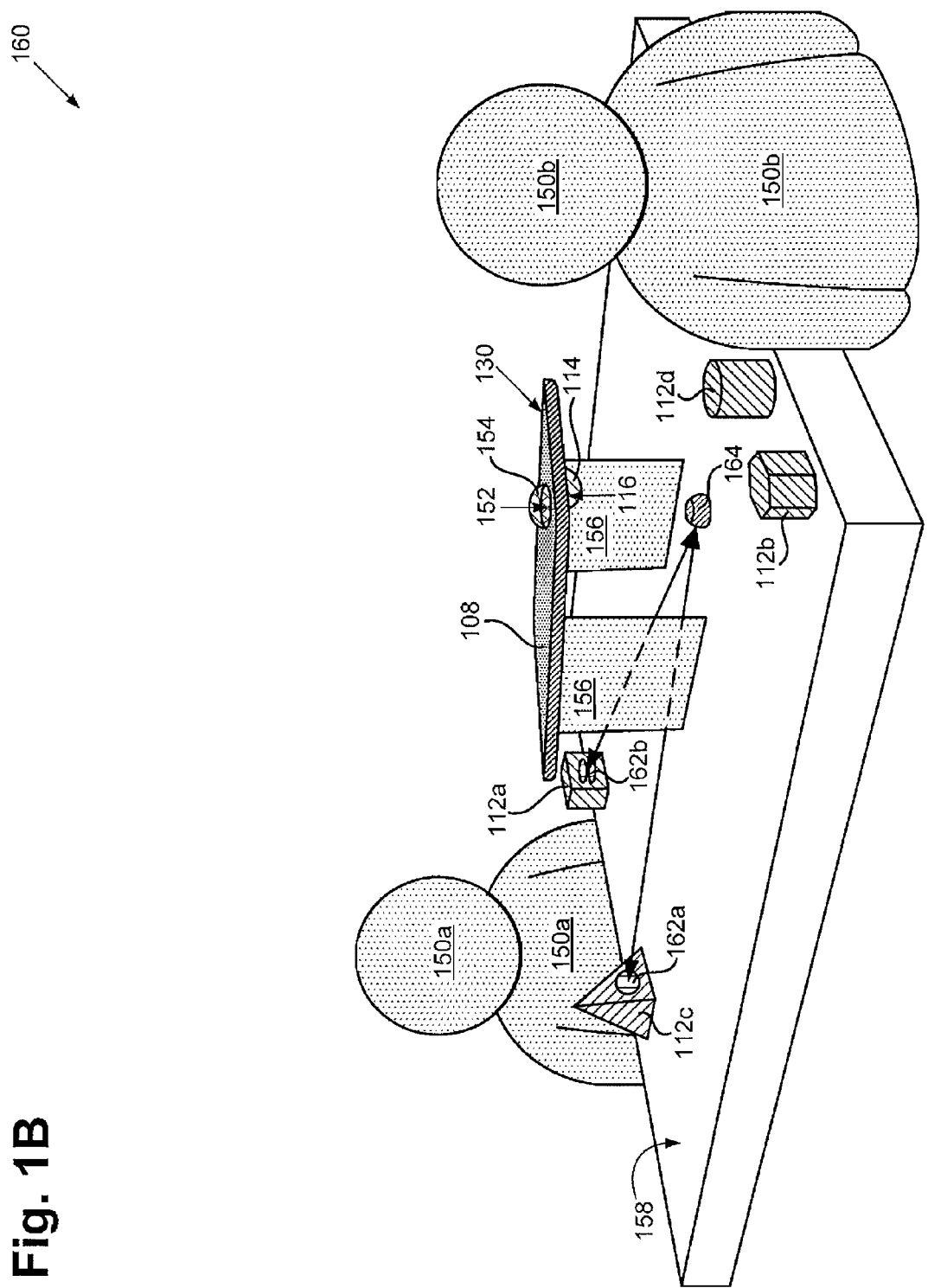

212e

212f

212g

212h

212i

212j

212k

ELECTRONIC DEVICES IN LOCAL INTERACTIONS BETWEEN USERS

BACKGROUND

As electronic components continue to be miniaturized, portable electronic devices are being provided with increased complexity and functionality. As examples, modern portable electronic devices often include one or more cameras, high-resolution displays, wireless transmitters/receivers, and powerful processors. At the same time, these portable electronic devices are becoming more affordable, and thus, more prevalent in the marketplace. As such, users are increasingly operating these portable electronic devices in daily interactions with other users. The interactions are not limited to basic communication, but may be more complex activities such as multiplayer gaming and video conferencing. In this context, it would be desirable to provide new technologies to enhance interactive experiences between users of portable electronic devices.

SUMMARY

The present disclosure is directed to electronic devices in local interactions between users, substantially as shown in and/or described in connection with at least one of the figures, as set forth more completely in the claims.

BRIEF DESCRIPTION OF THE DRAWINGS

FIG. 1B illustrates an exemplary local interaction between users, in accordance with implementations of the present disclosure.

DETAILED DESCRIPTION

Figure 1A:
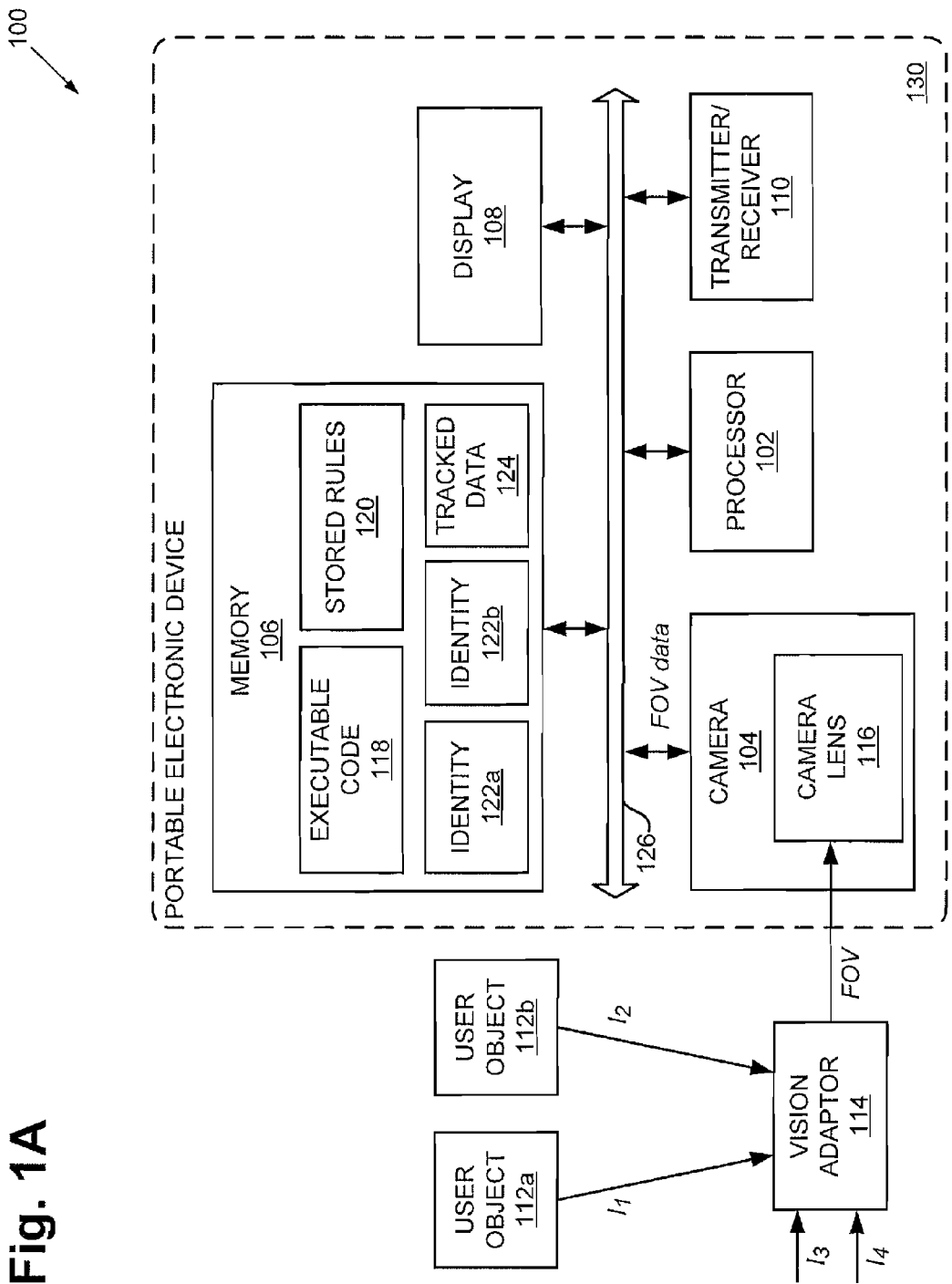
FIG. 1A shows a diagram of an exemplary system, in accordance with implementations of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring to FIGS. 1A and 1B, FIG. 1A shows a diagram of an exemplary system (a system 100), in accordance with implementations of the present disclosure. FIG. 1B illustrates an exemplary local interaction (a local interaction 160) between users (users 150a and 150b), in accordance with implementations of the present disclosure.

The system 100 includes a processor 102, a camera 104, a memory 106, a display 108, a transmitter/receiver 110, user objects 112a and 112b, and a vision adaptor 114. The camera 104 includes a camera lens 116. The memory 106 includes an executable code 118, stored rules 120, an identity 122a, an identity 122b, and tracked data 124. The system 100 can have additional constituents, such as user objects 112c and 112d, a camera lens 152, a vision adapter 154, a support 156, and a surface 158, shown in FIG. 1B.

In the present implementation, the processor 102, the camera 104, the memory 106, the display 108, and the transmitter/receiver 110 are integrated into an electronic device 130. However in various implementations, any of those constituents and/or functionality of those constituents can be distributed across multiple devices and/or can be housed separately from one another. Furthermore, aspects of the present disclosure do not require each constituent shown in FIG. 1A. For example, some implementations may not include the display 108 and the transmitter/receiver 110.

The processor 102, the camera 104, the memory 106, the display 108, and the transmitter/receiver 110 can communicate with each other over a bus 126. It will be appreciated that in other implementations, the processor 102, the camera 104, the memory 106, the display 108, and the transmitter/receiver 110 can communicate with each other over other means, for example, a plurality of dedicated lines, or a combination of buses and dedicated lines.

The implementation shown presents the electronic device 130 as a portable electronic device. Examples of portable electronic devices suitable for the electronic device 130 include mobile phones (e.g. smart phones), tablet computers, potable music players, digital cameras, mobile navigation devices (e.g. GPS devices), video game systems, laptops, and personal digital assistants, amongst others. More specific examples include, iOS® based devices from Apple®, such as those from the iPhone®, iPad®, and iPod® family of devices and various Google® Google Android™ based devices including smart phones and tablet computers.

The processor 102 can include, for example, a central processing unit (CPU), an embedded processor, a microcontroller, and/or other logical units. The processor 102 is configured to operate in accordance with the executable code 118 stored in the memory 106 to, for example, carry out processes in accordance with the present disclosure. The memory 106 can include, as examples, random access memory (RAM) and/or read only memory (ROM). In some implementations, for example, the memory 106 includes registers of the processor 102. The memory 106 can include one or more banks of memory and one or more types of memory, which can be located remotely from one another.

The system 100 can be utilized in the local interaction 160 between at least the users 150a and 150b, shown in FIG. 1B. Examples of the local interaction 160 include a meeting, a multiplayer game, for example, a card game, such as poker or black jack, or a board game, such as Monopoly®, chess, or checkers, and other local interactions between users. In doing so, the system 100 can enhance interactive experiences between the users 150a and 150b of the electronic devices 130. Furthermore, the system 100 can utilize any available components to provide robust interactive experiences.

In the system 100, the processor 102 is configured to control what is presented on the display 108. The display area can be of a fixed geometry and can be planar or curved, as examples. The display 108 can include displays such as a touch screen display, a liquid crystal display (LCD), a plasma display, and an organic light-emitting diode (OLED) display.

The processor 102 is further configured to control the transmitter/receiver 110 to communicate with other electronic devices. In some implementations, those other electronic devices include user objects, such as the user objects 112a and 112b, which will be described in more detail below. Although FIG. 1A shows the transmitter/receiver 110, some implementations only include a receiver or only include a transmitter. The transmitter/receiver 110 can be implemented utilizing a transceiver or utilizing a discrete transmitter and a discrete receiver. The transmitter/receiver 110 can utilize, as examples, one or more of Wireless Fidelity (Wi-Fi), Worldwide Interoperability for Microwave Access (WiMax), Zig-Bee, Bluetooth, Code Division Multiple Access (CDMA), Evolution-Data Optimized (EV-DO), Global System for Mobile Communications (GSM), Long Term Evolution (LTE), and other types of wireless interfaces.

The processor 102 is also configured to control the camera 104 and to receive field of view (FOV) data from the camera 104. In doing so, the camera lens 116 can capture at least a portion of the local interaction 160. The camera 104 can be a digital and/or analog camera. Furthermore, the FOV data can be from the camera lens 116 of the camera 104 and can be provided in pictures, video, and/or other formats. As shown in FIG. 1B, in some implementations, the system 100 includes the camera lens 152 in addition to or instead of the camera lens 116. The processor 102 can utilize the camera lens 152 in similar ways as what is described with respect to the camera lens 116.

The camera lens 152 can be utilized by the processor 102 independently from or in conjunction with the camera lens 116 in order to carry out processes in accordance with the present disclosure. In some implementations, the camera lens 152 is part of an additional camera not shown in FIGS. 1A and 1B. When utilized in conjunction with the processor 102, the camera lens 116 can expand the field of view (FOV) of the electronic device 130. In the present implementation, the camera lens 152 is situated on a top side of the electronic device 130 and the camera lens 116 is situated on an opposing bottom side of the electronic device 130.

In the implementation shown in FIG. 1B, the users 150a and 150b are situated on opposing sides of the electronic device 130. The electronic device 130 is situated between the users 150a and 150b over the surface 158. The surface 158 can be a substantially planar surface, such as a floor or a tabletop. The support 156 can be utilized to elevate the electronic device 130 over the surface 158. In some implementations, the support 156 is transparent so as to avoid obstructing the camera 104 from capturing the local interaction 160.

The camera lens 116 and the camera lens 152 may have a limited field of view. Thus, the camera 104 can have difficulty capturing the local interaction 160. For example, it may be desirable to include both of the users 150a and 150b in the FOV data. Furthermore, it may be desirable to include the user objects 112a, 112b, 112c, and 112d in the FOV data. However, due to the limited field of view, this may be complicated. In accordance with implementations of the present disclosure, the camera lens 116 can optionally have the vision adapter 114 that is configured to change a field of view of the camera lens 116. The vision adapter 114 can change the field of view of the camera lens 116 by, for example, bending light, redirecting light, and/or filtering light. The vision adaptor 114 can include any combination of one or more of a plastic, a glass, a resin, a mirror, and a prism. The vision adaptor 114 is shown as being on the camera lens 116, but the vision adaptor 114 can be elsewhere, such as on the surface 158. Also, the vision adaptor 114 is shown as being attached to the electronic device 130, but the vision adaptor 114 can be elsewhere, such as on the surface 158.

In the implementation shown in FIG. 1B, the vision adaptor 114 is configured to increase the field of view of the camera lens 116. For example, the vision adaptor 114 can be a wide-angle lens adaptor or a fisheye lens adaptor. In doing so, the vision adaptor 114 can enhance ability of the camera lens 116 to capture the local interaction 160. Also in the implementation shown, the vision adaptor 114 increases the field of view of the camera lens 154 to at least a half-hemisphere. Thus, for example, the FOV data can include the users 150a and 150b and the user objects 112a, 112b, 112c, and 112d.

Instead of or in addition to increasing the field of view, the vision adaptor 114 can otherwise change the field of view. For example, in some implementations, the vision adaptor 114 changes the directionality of the camera lens 116. As one specific example, the vision adaptor 114 can include two mirrors angled so that the camera lens 116 can capture the users 150a and 150b, but the camera lens 116 may no longer be capable of capturing a region obstructed by the vision adaptor 114.

The camera lens 152 can also optionally include the vision adaptor 154, which can be similar to or different than the vision adaptor 114. Thus, for example, where the vision adaptors 114 and 154 are both wide-angle lens adaptors, the camera lens 116 and the camera lens 152 can capture a substantial portion of the local interaction 160.

The processor 102 is configured to detect user input (e.g. the user inputs $I_1$, $I_2$, $I_3$, and $I_4$) through at least a camera lens (e.g. the camera lens 116 of the camera 104). The detection can include the processor 102 receiving and interpreting at least the FOV data, which may include any of the user inputs $I_1$, $I_2$, $I_3$, and $I_4$. The detecting can utilize suitable image and/or video processing techniques including, but not limited to any combination of facial recognition, lip reading, shape recognition, pattern recognition, color recognition, light recognition, and/or gesture recognition. Furthermore, the detecting of the user inputs $I_1$, $I_2$, $I_3$, and $I_4$ may utilize more than the FOV data. For example, the detecting may further utilize a microphone (e.g. to receive sound data, such as voice data), a button, and other components.

The user inputs $I_1$, $I_2$, $I_3$, and $I_4$ are from one or more users, such as the users 150a and 150b. In some implementations, at least one of the user inputs $I_1$, $I_2$, $I_3$, and $I_4$ is at least partially from a physical gesture made by the user 150a and/or the user 150b. For example, the user input $I_3$ can include the user 150a moving a hand, raising an eyebrow, standing up, or tilting a head. The processor 102 can detect the physical gesture in the FOV data from the camera lens 116.

At least one of the user inputs (e.g. the user inputs $I_1$ and $I_2$) can be at least partially from a user object (e.g. the user objects 112a and 112b) and the processor 102 detecting the user input can include recognizing the user object. In some implementations, the processor 102 can utilize the FOV data to distinguish between at least some of the user objects 112a and 112b. The detection by the processor 102 of the user inputs can include additional variables, such as a location of, an orientation of, physical movement of, or other attributes of the user object or user objects. Furthermore, the detection by the processor 102 can be combined with a physical gesture made by a user, or with other variables.

Figure 2:
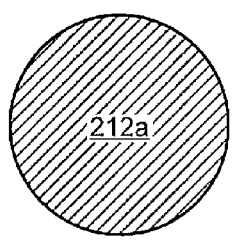
FIG. 2 shows exemplary user objects, in accordance with implementations of the present disclosure.
Figure 2:
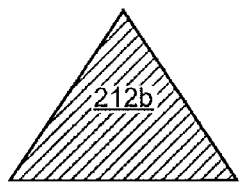
Figure 2:
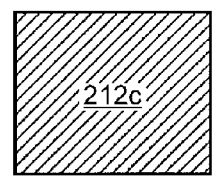
Figure 2:
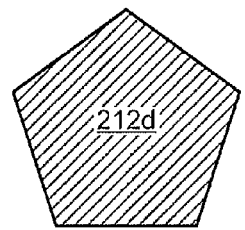
Figure 2:
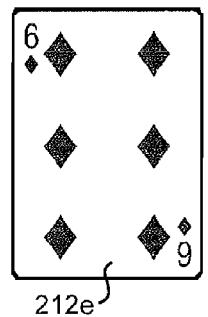
Figure 2:
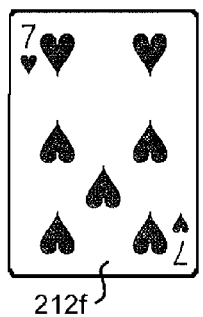
Figure 2:
Figure 2:
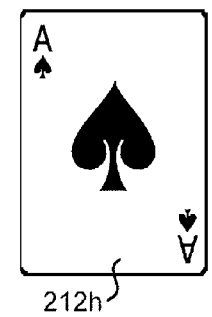
Figure 2:
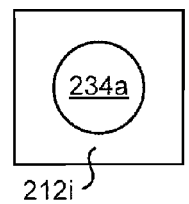
Figure 2:
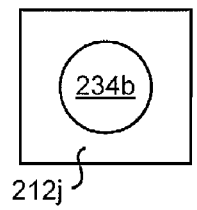
Figure 2:
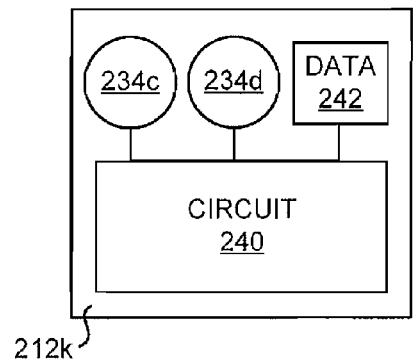

Referring to FIG. 2, FIG. 2 shows exemplary user objects, in accordance with implementations of the present disclosure. More particularly, FIG. 2 shows user objects 212a, 212b, 212c, 212d, 212e, 212f, 212g, 212h, 212i, 212j, and 212k (referred to collectively as "user objects 212"). Any of the user objects 212 can correspond to any of the user objects 112a, 112b, 112c, and 112d. In some implementations, the processor 102 of FIG. 1A detecting the user inputs $I_1$ or $I_2$ includes recognizing any of the user objects 212. The detection by the processor 102 can include other variables, such as a location of, an orientation of, physical movement of, or other attributes of the user objects 212. In some implementations, the detection by the processor 102 includes a proximity of at least one of the user objects 212 to the user 150a or the user 150b.

In some implementations, the processor 102 of FIG. 1 detecting the user inputs $I_1$ or $I_2$ can include recognizing a shape of any of the user objects 212. The user objects 212a, 212b, 212c, and 212d can be recognized as user objects, and in some implementations, distinguished from one another by the processor 102 based at least on their shape, which can be recognized by the processor 102 utilizing the FOV data from the camera lens 116.

The user objects 212e, 212f, 212g, and 212h each include visual indicia thereon. As an example, the visual indicia shown correspond to playing cards. The processor 102 can utilize the visual indicia to recognize at least some of the user objects 212. For example, the processor 102 detecting the user inputs $I_1$ or $I_2$ can include recognizing the visual indicia on at least one of the user objects 212 in the FOV data through camera lens 116. The processor 102 can utilize the visual indicia to recognize user object 212 as a Six of Diamonds. Furthermore, in some implementations, the processor 102 can utilize the visual indicia to distinguish between different ones of the user objects 212e, 212f, 212g, and 212h. The detection by the processor 102 can include other variables, such as a location of, an orientation of, physical movement of, or other attributes of the visual indicia. In the implementation shown, the visual indicia includes an image (e.g. a playing card image) on each of the user objects 212e, 212f, 212g, and 212h. The visual indicia can be static or dynamic. Utilizing the visual indicia can simplify the processor 102 recognizing the user objects 212. For example, it may be less complex for the processor 102 to recognize the visual indicia compared to other characteristics of the user objects 212.

The visual indicia on the user objects 212e, 212f, 212g, and 212h includes an image. However, in other implementations, the visual indicia include a color on the user objects 212. For example, the user objects 212 can be different colors, which the processor 102 can utilize to recognize at least some of the user objects 212. In some implementations, the visual indicia include a marked pattern on the user objects 212, or other markings.

In some implementations, the visual indicia includes retro reflective indicia on at least one of the user objects 212, where the processor 102 detects the user inputs $I_1$ or $I_2$ by recognizing the retro reflective indicia on the at least one of the user objects 212. For example, FIG. 1B shows the user object 112a having a retro reflective indicia 162a and the user object 112c having a retro reflective indicia 162b. The retro reflective indicia 162a and 162b can be form a pattern recognizable by the processor 102. By utilizing a light source 164 near the camera lens 116, for example, light from the light source 164 can be reflected back from the retro reflective indicia 162a and 162b towards the camera lens 116, as shown in FIG. 1B. Thus, the retro reflective indicia 162a and 162b can be included in the FOV data and recognized by the processor 102, even where the user objects 112a and 112c are not otherwise visible to the camera lens 116 (e.g. where the camera lens 116 does not have the vision adaptor 114). The light source 164 can be on the electronic device 130 or near the electronic device 130. In the implementation shown, the light source 164 is on the surface 158. However, in some implementation, the light source 164 includes a flash bulb of the camera 104, such as a light emitting diode (LED) bulb.

Returning to FIG. 2, in some implementations, each of the user objects 212 are configured to produce light, and the processor 102 detecting the user inputs $I_1$ and $I_2$ includes recognizing the light produced by the at least one of the user objects 212. The light can be static or dynamic and can be based on one or more colors and/or intensities of the light. As one example, FIG. 2 shows the user objects 212i and 212j, which have at least respective light sources 234a and 234b that are configured to produce light. In some implementations, the light produced by the light sources 234a and 234b are in the non-visible spectrum. In other implementations, the light produced by the light sources 234a and 234b is in the visible spectrum.

In some implementations, the processor 102 recognizing the light produced by the at least one of the user objects 212 includes recognizing a color of the light. Furthermore, in various implementations, the user objects 212 can produce at least one color of light and the processor 102 can distinguish between different colors of light. In another example, the processor 102 recognizing the light produced by the at least one of the user objects 212 includes recognizing a light pattern produced by at least one of the user objects 212. For example, at least one of the user objects 212i and 212j can produce a light pattern utilizing any combination of changing in intensity (e.g. flashing and dimming) and/or color that is recognizable by the processor 102 utilizing the FOV data. In some implementations, the light pattern produced by the user object 212i is different than the light pattern produced by the user object 212j.

The user objects 212i and 212j can each include more than one light source. For example, the user object 212k includes light sources 234c and 234d. The light pattern produced by the user object 212k can utilize both of the light sources 234c and 234d and can be based on color and/or intensity of at least the light sources 234c and 234d. In some implementations, the user objects 212 include a circuit for controlling light sources, such as any of the light sources 234a, 234b, 234c, and 234d. The circuit can be utilized by the user objects 212 to produce a light pattern. As one example, the user object 212k includes a circuit 240. The circuit 240 can be configured to control the light sources 234c and 234d.

In some implementations, each of the user objects 212 are configured to transmit data and the processor 102 is configured to receive the data transmitted by the user objects 212. For example, the circuit 240 in the user object 212k is for transmitting data 242 to the processor 102. The data 242 can be stored in the user object 212k and can be utilized by the processor 102 to track a local interaction between at least two users. As one example, the circuit 240 can control at least one of the light sources 234c and 234d to communicate data to the processor 102. For example, the light pattern can correspond to the data 242 and at least one of the light sources 234c and 234d can change in intensity and/or color to communicate the data 242 to the processor 102 through the FOV data. In some implementations, the circuit 240 can communicate the data 242 to the processor 102 utilizing other means, such as Wi-Fi, WiMax, ZigBee, Bluetooth, CDMA, EV-DO, GSM, LTE, and other types of wireless interfaces through the transmitter/receiver 110.

Returning to FIGS. 1A and 1B, the processor 102 is additionally configured to determine that an identity (e.g. the identity 122a or 122b) of a user (e.g. the user 150a or the user 150b), selected from identities of at least two users (e.g. the identities 122a and 122b), is associated with the user input (e.g. any of the user inputs $I_1$, $I_2$, $I_3$, and $I_4$). For example, the processor 102 can determine that the identity 122a of the user 150a is associated with the user input $I_1$. The processor 102 can also determine that the identity 122b of the user 150b is associated with the user input $I_2$. The association can optionally be based on variables in addition to any of the user inputs $I_1$, $I_2$, $I_3$, and $I_4$.

The association may be based on at least one of the user objects 112a, 112b, 112c, and 112d in the FOV data corresponding to at least one of the identities 122a and 122b. As one example, the processor 102 can determine that user object 112a corresponds to the identify 122a. This determination may be based on a location of the user object 112a with respect to the user 150a, and/or other factors, such as data stored in the memory 106 that indicates the correspondence to the identity 122a. The processor 102 can then associate the user input $I_1$ with the identity 122a based on the user input $I_1$ being from the user object 112a.

The processor 102 is also configured to track a local interaction (e.g. the local interaction 160) between the at least two users (e.g. the users 150a and 150b) based on at least the identity (e.g. the identity 122a or 122b), the user input (e.g. any of the user inputs $I_1$, $I_2$, $I_3$, and $I_4$), and stored rules that govern the local interaction (e.g. the stored rules 120). For example, the processor 102 can track the local interaction 160 between at least the users 150a and 150b by utilizing the tracked data 124. Based on the tracking of the local interaction 160, the processor 102 can perform an action utilizing, for example, the display 108, a speaker in the electronic device 130, or other electronic components.

The local interaction 160 can be governed by the stored rules 120. For example, where the local interaction 160 includes turn taking between the users 150a and 150b, the stored rules 120 can govern the turn taking. As another example, where the local interaction includes a multiplayer game being played by the users 150a and 150b, the scored rules 120 can govern a scoring system (e.g. point system) of the multiplayer game. In this way, the processor 102 can, for example, moderate the local interaction 160 to enhance interactive experiences between the users 150a and 150b of the electronic devices 130.

As one example, the tracking can include the processor 102 determining whether the user 150a and/or the user 150b has complied with the stored rules 120 that govern the local interaction 160. Based on this determination, the processor 102 can perform an action, such as, presenting a notification to the users 150a and 150b using a speaker and/or the display 108.

As another example, the tracking can include the processor 102 keeping scores in a multiplayer game (e.g. the local interaction 160) being played by the users 150a and 150b. The multiplayer game may utilize the user objects 112a, 112b, 112c, and 112d as game pieces. Furthermore, the scores of the multiplayer game can be stored in the tracked data 124. Based on the tracking of the multiplayer game, the processor 102 can, for example, update the scores of the multiplayer game and/or display the scores of the multiplayer game on the display 108 or otherwise present the scores of the multiplayer game.

Figure 3:
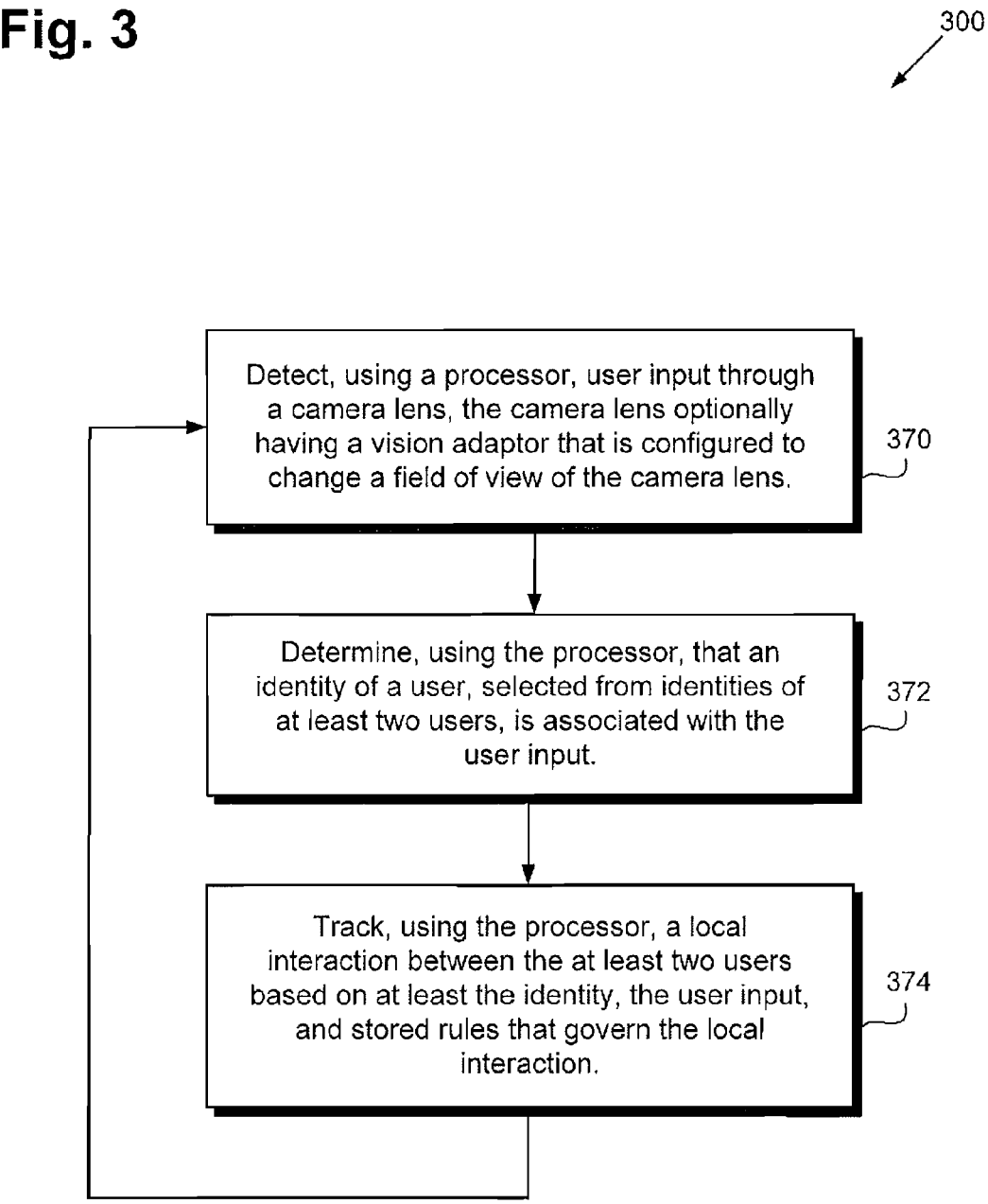
FIG. 3 shows a process flow diagram illustrating an exemplary process, in accordance with implementations of the present disclosure.

Referring now to FIG. 3, FIG. 3 shows a process flow diagram illustrating an exemplary process, in accordance with implementations of the present disclosure. More particularly, FIG. 3 shows a process flow diagram illustrating a process 300. The implementation illustrated by the process 300 can be performed utilizing the system 100 in FIG. 1A, as one example. However, the process 300 can be performed utilizing systems other than the system 100 in FIG. 1A.

Referring now to FIG. 3 and FIGS. 1A and 1B, the process 300 includes detecting, using a processor (e.g. the processor 102), user input (e.g. the user inputs $I_1$, $I_2$, $I_3$, or $I_4$) through a camera lens (e.g. the camera lens 116 or the camera lens 152), the camera lens optionally having a vision adaptor (e.g. the vision adaptor 114 or 154) that is configured to change a field of view (e.g. FOV) of the camera lens (370).

Still referring to FIG. 3 and FIGS. 1A and 1B, the process 300 includes determining, using the processor (e.g. the processor 102), that an identity (e.g. the identity 122a or 122b) of a user (e.g. the user 150a or 150b), selected from identities of at least two users (e.g. the identity 122a and 122b), is associated with the user input (e.g. the user inputs $I_1$, $I_2$, $I_3$, or $I_4$) (372).

In continued reference to FIG. 3 and FIGS. 1A and 1B, the process 300 includes tracking, using the processor (e.g. the processor 102), a local interaction (e.g. the local interaction 160) between the at least two users (e.g. the users 150a and 150b) based on at least the identity (e.g. the identity 122a or 122b), the user input (e.g. the user inputs $I_1$, $I_2$, $I_3$, or $I_4$), and stored rules that govern the local interaction (e.g. the stored rules 120) (374). As indicated in FIG. 3, the process 300 can optionally be repeated as the local interaction continues.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for facilitating a gameplay between at least two users playing a game using one or more game objects, the method comprising:
    detecting, using a processor, a user input through a camera lens, wherein the user input uses the one or more game objects, and the detecting includes recognizing the one or more game objects through the camera lens;
    determining, using the processor, an identity of a user of the at least two users based on the user input;
    tracking, using the processor, a local-interaction between the at least two users based on at least the identity, the user input, and stored rules that govern the local interaction.

2. The method of claim 1, wherein the tracking comprises determining whether the user has complied with the stored rules that govern the local interaction.

3. The method of claim 1, wherein the local interaction comprises turn taking between the at least two users.

4. The method of claim 1, wherein the user input is from a physical gesture made by the user.

5. The method of claim 1, wherein the detecting comprises recognizing a visual indicia on the one or more game objects.

6. The method of claim 1, wherein the detecting comprises recognizing a light pattern produced by the one or more game objects.

7. The method of claim 1, wherein the camera lens has a vision adaptor that is configured to change a field of view of the camera lens.

8. A mobile device for facilitating a gameplay between at least two users playing a game using one or more game objects, the mobile device comprising:
    a camera lens;
    a processor configured to:
        detect, using a processor, a user input through a camera lens, wherein the user input uses the one or more game objects, and the detecting includes recognizing the one or more game objects through the camera lens;
        determine, using the processor, an identity of a user of the at least two users based on the user input;

track, using the processor, a local interaction between the at least two users based on at least the identity, the user input, and stored rules that govern the local interaction.

9. The mobile device of claim 8, wherein the tracking comprises determining whether the user has complied with the stored rules that govern the local interaction.

10. The mobile device of claim 8, wherein the local interaction comprises turn taking between the at least two users.

11. The mobile device of claim 8, wherein the camera lens has a vision adaptor that is configured to change a field of view of the camera lens.

12. The mobile device of claim 8, wherein the camera lens has a vision adaptor that is configured to increase the field of view of the camera lens.

13. The mobile device of claim 8, wherein the one or more game objects include a visual indicia, wherein the processor detects the user input by recognizing the visual indicia on the one or more game objects.

14. The mobile device of claim 8, wherein the one or more game objects include a retro reflective indicia, wherein the processor detects the user input by recognizing the retro reflective indicia on the one or more game objects.

15. The mobile device of claim 8, wherein the one or more game objects are configured to produce a light pattern, and wherein the processor detects the user input by recognizing the light pattern produced by the one or more game objects.

16. The mobile device of claim 8, wherein the one or more game objects are configured to transmit data and the processor is configured to receive the data transmitted by the one or more game objects.

\* \* \* \* \*